US012384065B2

(12) United States Patent
Lee

(10) Patent No.: US 12,384,065 B2
(45) Date of Patent: Aug. 12, 2025

(54) WRIST WEARABLE KNIFE

(71) Applicant: Geumwook Lee, Hwaseong-si (KR)

(72) Inventor: Geumwook Lee, Hwaseong-si (KR)

( * ) Notice: Subject to any disclaimer, the term of this patent is extended or adjusted under 35 U.S.C. 154(b) by 0 days.

(21) Appl. No.: 18/024,984

(22) PCT Filed: Nov. 16, 2021

(86) PCT No.: PCT/KR2021/016758

§ 371 (c)(1),
(2) Date: Mar. 7, 2023

(87) PCT Pub. No.: WO2023/090470

PCT Pub. Date: May 25, 2023

(65) Prior Publication Data

US 2024/0278445 A1 Aug. 22, 2024

(30) Foreign Application Priority Data

Nov. 16, 2021 (KR) ........................ 10-2021-0157396

(51) Int. Cl.
*B26B 29/02* (2006.01)
*A44C 5/00* (2006.01)
*B26B 5/00* (2006.01)

(52) U.S. Cl.
CPC ............ *B26B 29/025* (2013.01); *A44C 5/003* (2013.01); *B26B 5/00* (2013.01)

(58) Field of Classification Search
None
See application file for complete search history.

(56) References Cited

U.S. PATENT DOCUMENTS

| | | | | |
|---|---|---|---|---|
| 5,647,130 | A * | 7/1997 | Collins | B26B 29/025 30/162 |
| 5,926,959 | A * | 7/1999 | Collins | B26B 29/025 30/162 |
| 9,446,528 | B1 * | 9/2016 | Zahorski | B26B 27/007 |
| D904,847 | S * | 12/2020 | Hogg | D8/98 |
| 12,240,137 | B1 * | 3/2025 | Chiocca | A45F 5/00 |
| 2017/0015011 | A1 | 1/2017 | Stroh | |
| 2024/0278445 | A1 * | 8/2024 | Lee | B26B 11/00 |

FOREIGN PATENT DOCUMENTS

| | | | |
|---|---|---|---|
| CN | 212385519 | U | 1/2021 |
| JP | 2002-040168 | A | 2/2002 |
| JP | 2006-116273 | A | 5/2006 |
| KR | 10-1300827 | B1 | 8/2013 |
| WO | WO-2025018459 | A1 * | 1/2025 |

OTHER PUBLICATIONS

English translation of JP-2002040168-A, dated Feb. 6, 2002.*
English translation of WO-2025018459-A1, dated Jan. 23, 2025.*
International Search Report for PCT/KR2021/016758 mailed Jul. 20, 2022 from Korean Intellectual Property Office.

* cited by examiner

*Primary Examiner* — Hwei-Siu C Payer
(74) *Attorney, Agent, or Firm* — Revolution IP, PLLC

(57) ABSTRACT

An object of the present invention is to provide a wrist wearable knife that can always be worn on the user's wrist through a wrist strap such as a watch strap or a bracelet, wherein the wrist wearable knife for wearing on a wrist of a user through a wrist strap includes: a sheath body for attaching to and detaching the wrist strap; and a blade body detachably provided in the sheath body.

2 Claims, 9 Drawing Sheets

WRIST WEARABLE KNIFE

TECHNICAL FIELD

The present invention relates to a knife.

BACKGROUND ART

Generally, knives are tools used to cut, slice, and sharpen objects. These knives are classified into stationery knives used in students or offices, cooking knives used for trimming and cutting food, carving knives used in art class, and the like, depending on their uses.

In addition, since the blade is very sharp, the knife includes a sheath to cover the blade in order to be used for carrying purposes. That is, these knives are divided into portable knives that can be carried with a sheath and general knives that cannot be carried without a sheath, depending on whether they are carried.

A conventional portable knife includes a knife body having a blade and a handle, and a sheath covering the blade of the blade body. Therefore, the knife can be carried with the blade accommodated in the sheath.

However, the conventional portable knife is generally placed in other places such as the trunk of a car or a tent, rather than being held by the user at all times so there is a problem that the conventional portable knife cannot be used in a situation where the conventional portable knife is required.

For example, in a situation where the knife is needed, such as when the user is in distress or in an emergency, such as in the mountains or the sea, a situation in which a knife is not currently in possession and dies unjustly may occur. In preparation for such disasters, it is necessary to carry survival items such as knives with you at almost all times. In other words, the requirement for survival items such as knives is to keep them worn, and items that are repeatedly removed from the body and taken out of pockets because they are uncomfortable are not survival items. No matter where the user goes, survival items such as knives are meaningful when the user always carries the knifes, and this is the basis of survival items.

DISCLOSURE

Technical Problem

An object of the present invention is to provide a wrist wearable knife that can always be worn on the user's wrist through a wrist strap such as a watch strap or a bracelet.

Another technical problem of the present invention is to provide a wrist wearable knife that can be detachably provided on the wrist strap and can be firmly fixed to the wrist strap when mounted on the wrist strap.

Yet another technical problem of the present invention is to provide a wrist wearable knife in which quickly and easily attach and detach the blade body can be quickly and easily attached to and detached from the sheath body.

Still yet another technical problem of the present invention is to provide a wrist wearable knife capable of increasing stability by preventing the blade body from sliding out of the sheath body.

Still yet another technical problem of the present invention is to provide a wrist wearable knife capable of increasing the grip of the blade body when the user holds the blade body with his or her fingers.

Technical Solution

In order to achieve the object, according to an embodiment of the present invention, a wrist wearable knife for wearing on a wrist of a user through a wrist strap includes: a sheath body for attaching to and detaching the wrist strap; and a blade body detachably provided in the sheath body.

The wrist wearable knife according to the embodiment of the present invention may further include a wrist strap detachable portion for attaching and detaching the sheath body to and from the wrist strap.

The wrist strap detachable portion may include a wrist contact portion provided to be spaced apart from a surface of the sheath body, which faces the wrist of the user, a spacer connection portion connecting the wrist contact portion to one side of the sheath body in a spaced stat, and a wrist strap through-hole forming a separation space between the sheath body and the wrist contact portion and detachably passing the wrist strap.

The wrist strap detachable portion may further include a wrist strap pressing portion applying a fixing force to the wrist strap in a state where the wrist strap passes through the wrist strap through-hole.

The wrist strap pressing portion may protrude convexly from the sheath body toward the wrist contact portion, and elastically press and fix the wrist strap that passes through the wrist strap through through-hole.

The wrist strap pressing portion may have one end provided in a cantilever shape on the sheath body and its center may be bent convexly toward the wrist contact portion.

The wrist wearable knife according to the embodiment of the present invention may further include a blade body detachable portion for attaching and detaching the blade body to and from the sheath body.

The blade body detachable portion may include: left and right blade body accommodating portions provided at both edges of the sheath body, respectively, and surrounding and accommodating both circumferential surfaces of the blade body; and a blade body fitting portion detachably fitting the blade body into the left and right blade body accommodating portions.

The blade body fitting portion may include: a blade guide inclined surface formed on the front of the upper surface of the sheath body, and while the blade body is inserted between the left and right blade body accommodating portions, obliquely guiding the blade body to the front of the sheath body; a blade body support portion connected across the front end of each of the left and right blade body accommodating portions, and when the rear part of the blade body guided to the blade body guide inclined surface is pressed from the top to the bottom, supporting the front part of the blade body; and a blade body upper catching portion provided at the rear end of each of the left and right blade body accommodating portions, and when the rear part of the blade body is pressed from the top to the bottom, inserted and caught with the blade body.

Each of the left and right blade body accommodating portions may be elastically supported on the sheath body.

The blade body fitting portion may further include a blade body rear catching portion provided at the rear end of each of the left and right blade body accommodating portions and preventing the blade body from falling backward while being caught by the blade body upper catching portion.

The blade body fitting portion may further include a finger insertion portion formed between the rear ends of the left and right blade body accommodating portions and opened for inserting a finger to lift the rear end of the blade body.

The blade body fitting portion may further include a drain hole formed between the blade body support portion and the sheath body, and discharging water flowing into the end of the blade body guide inclined surface.

The blade body fitting portion may further include a plurality of removal anti-slip protrusions provided at the front part of the blade body, and when the blade body is removed, preventing the finger from sliding while the front part of the blade body is pressed with the other one finger by lifting the rear part of the blade body with any one finger through the finger insertion portion.

The wrist wearable knife according to the embodiment of the present invention may further include a grip portion provided in the blade body and increasing the grip sense of the blade body while using the blade body.

The grip portion may include a gripping hole opened at the center of the blade body and holding a position where a thumb and a middle finger of a wearer face each other; and a plurality of main grip protrusions formed along the inner circumferential surface of the gripping hole and preventing the thumb and the middle finger facing each other from slipping.

The grip portion may further include a plurality of auxiliary grip protrusions provided at the front part of one side circumferential surface of the blade body and preventing slipping when the wearer's index finger touches them, and the blade may be provided at the front of the circumferential surface of the other side of the blade body.

The wrist wearable knife according to the embodiment of the present invention may further include a finger support portion protruding on the upper surface of the sheath body to correspond to the gripping hole, and applying the pressing force to the sheath body through the finger support portion with the other one finger when the blade body is removed while lifting the blade body with one finger so that the blade body is smoothly separated from the sheath body.

Advantageous Effects

As described above, the wrist wearable knife according to the embodiment of the present invention may have the following effects.

According to the embodiment of the present invention, a wrist wearable knife for wearing on a user's wrist through a wrist strap provides a technical configuration including a sheath body and a blade body, so that the sheath body can be worn on the user's wrist through a wrist strap, the blade of the blade body can be used by removing the blade body from the sheath body, and after use, the blade body can be mounted on the sheath body again, and ultimately, the knife can always be worn on the wrist, and the knife can be used as a survival item not only in daily life, but also in the case of a user in distress or in an emergency situation, such as in the mountains or the sea.

In addition, according to an embodiment of the present invention, the knife further includes a wrist strap attachment and detachment unit, and the wrist strap attachment and detachment unit provides a technical configuration including a wrist contact portion, a spacer connection portion, and a wrist strap through-hole, so that the wrist wearable knife of the present invention can be easily and quickly detached (mounted on or removed from) with respect to the wrist strap by pulling the wrist strap in and out through the wrist strap through-hole.

In addition, according to the embodiment of the present invention, since the wrist strap detachable unit provides a technical configuration further including a wrist strap pressing unit, in a state where the blade body is attached to the wrist strap, the blade body can be firmly fixed to the wrist strap through the wrist strap pressing unit wen the blade body is mounted on the wrist strap.

In addition, according to the embodiment of the present invention, the wrist wearable knife further includes a blade body detachable portion, and since the blade body detachable portion provides a technical configuration including left and right blade body accommodating portions and blade body fitting portions, the sheath body can be smoothly accommodated in the blade body through the left and right blade accommodating portions, and the blade body can be easily and quickly detachable with respect to the blade body by inserting the blade body into the left and right blade body accommodating portions through the blade body fitting portion, and in particular, since an inserting method is taken, it is possible to further increase stability by preventing sliding from the body.

In addition, according to the embodiment of the present invention, since the blade body fitting portion provides a technical configuration including a blade body guide slope, a blade body support portion, and an upper holding portion of the blade body, while the blade body is inserted between the left and right blade body accommodating portions, the blade body can be guided to the front part of the sheath body obliquely through the blade body guide inclined surface, and when the rear part of the blade body is pressed from top to bottom after being guided by the blade body guide inclined surface, a force of pressing the rear part of the blade body while supporting the front part of the blade body by the blade body support portion can be fully applied, and while the rear part of the blade body is pressed from the top to the bottom by the pressing force, so that the blade body can be inserted and caught in a blade body upper catching portion.

In addition, according to the embodiment of the present invention, since each of the left and right blade body accommodating portions provides a technical configuration in which the sheath is elastically supported, the left and right blade accommodating portions can be smoothly widened to the left and right while the blade body is inserted into the blade body upper catching portion.

In addition, according to the embodiment of the present invention, since the blade body fitting portion provides a technical configuration including a blade body rear catching portion, it is possible to prevent the blade body from falling backward while being caught in the blade body upper catching portion, so the blade of the blade body can be handled more safely.

In addition, according to the embodiment of the present invention, since the wrist wearable knife a technical configuration further including a grip portion, a grip sense of the blade body can be improved when the user holds the blade body with his or her fingers.

In addition, according to the embodiment of the present invention, since the grip portion provides a technical configuration including a gripping hole and a plurality of main grip protrusions, it is possible to hold the position where the thumb and middle finger face each other with respect to the blade body through the gripping hole, and it is possible to prevent the thumb and middle finger facing each other from slipping through the plurality of main grip protrusions, thereby increasing the grip sense.

In addition, according to the embodiment of the present invention, since the grip portion provides a technical configuration further including a plurality of auxiliary grip protrusions, even if the index finger presses the front part of one side circumferential surface of the blade body through the plurality of auxiliary grip protrusions, the index finger can be prevented from being slipping, thereby further increasing the grip sense along with a plurality of main grip protrusions.

MODE FOR INVENTION

Hereinafter, an embodiment of the present invention will be described more fully hereinafter with reference to the accompanying drawings so as to be easily implemented by those skilled in the art. However, the present invention can be realized in various different forms, and is not limited to the exemplary embodiments described herein.

Figure 1:
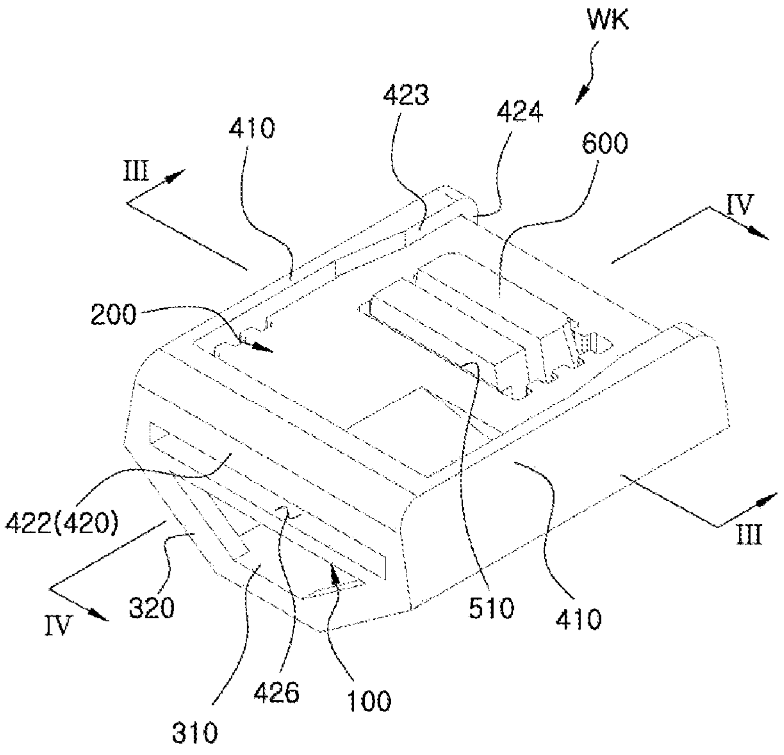
FIG. 1 is a perspective view schematically illustrating a wrist wearable knife according to an embodiment of the present invention.
Figure 2:
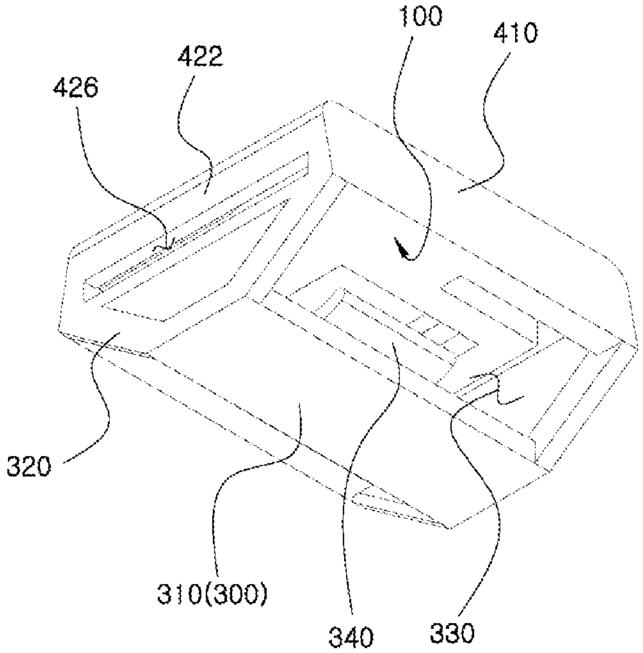
FIG. 2 is a bottom perspective view of the wrist wearable knife of FIG. 1 viewed from the bottom.
Figure 3:
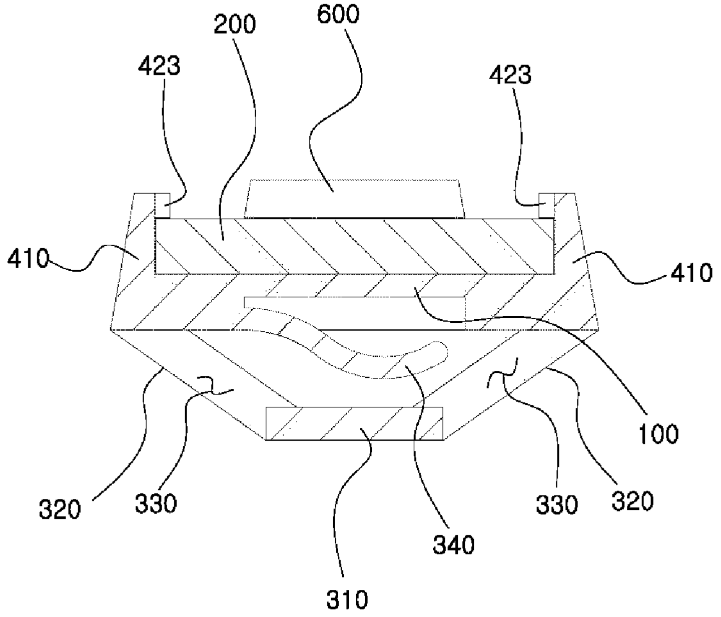
FIG. 3 is a view of the wrist wearable knife of FIG. 1 taken along line III-III.
Figure 4:
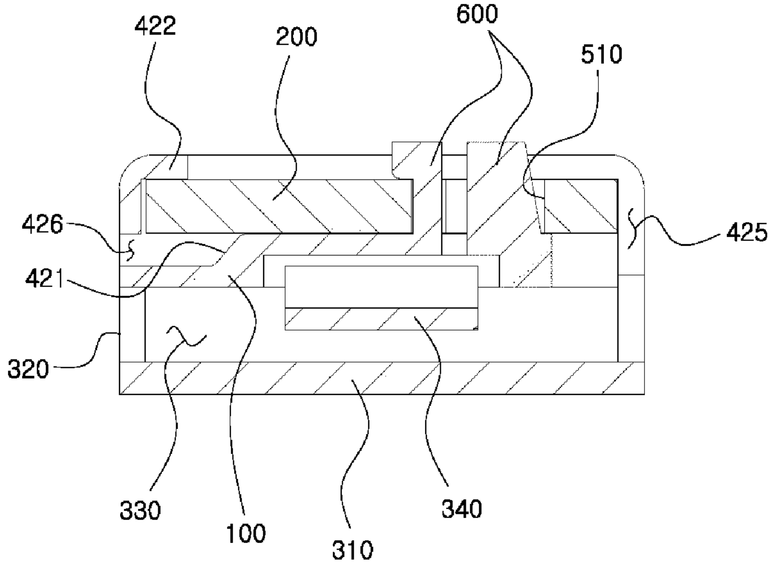
FIG. 4 is a view of the wrist wearable knife of FIG. 1 taken along line IV-IV.

FIG. 1 is a perspective view schematically illustrating a wrist wearable knife according to an embodiment of the present invention, FIG. 2 is a bottom perspective view of the wrist wearable knife of FIG. 1 viewed from the bottom, FIG. 3 is a view of the wrist wearable knife of FIG. 1 taken along line III-III, and FIG. 4 is a view of the wrist wearable knife of FIG. 1 taken along line IV-IV.

Figure 5:
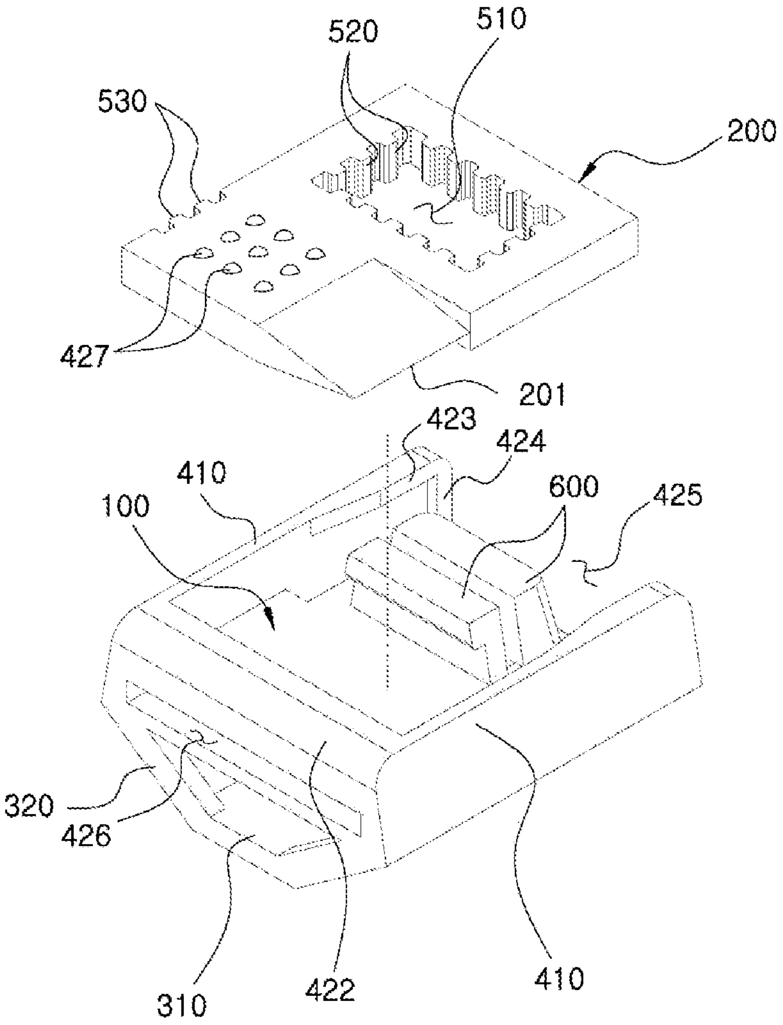
FIG. 5 is an exploded perspective view illustrating explosion of the wrist wearable knife of FIG. 1.
Figure 6:
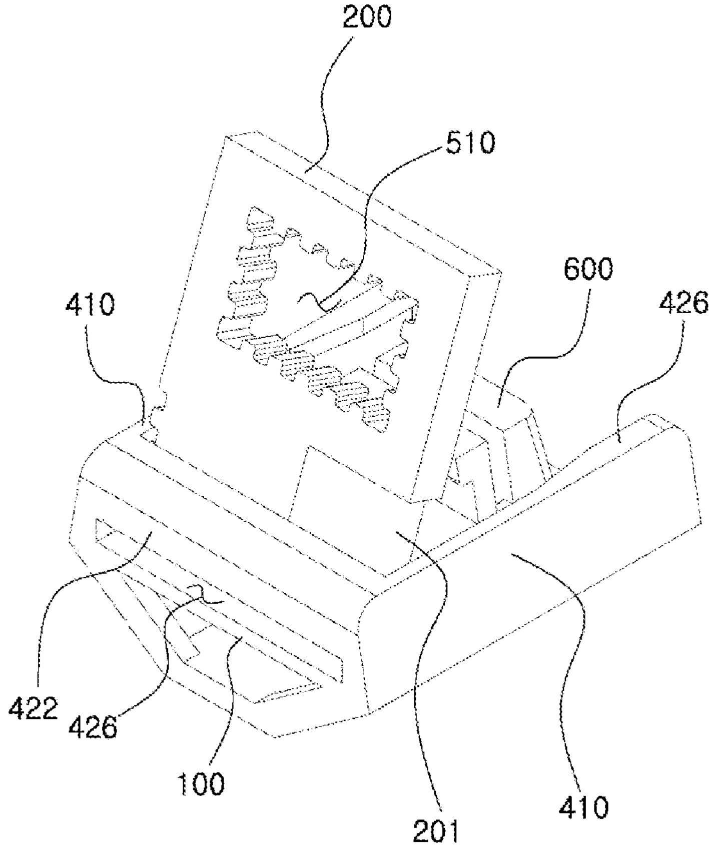
FIG. 6 is an assembly perspective view illustrating a process of fitting a blade body into a sheath body of the wrist wearable knife of FIG. 5.
Figure 7:
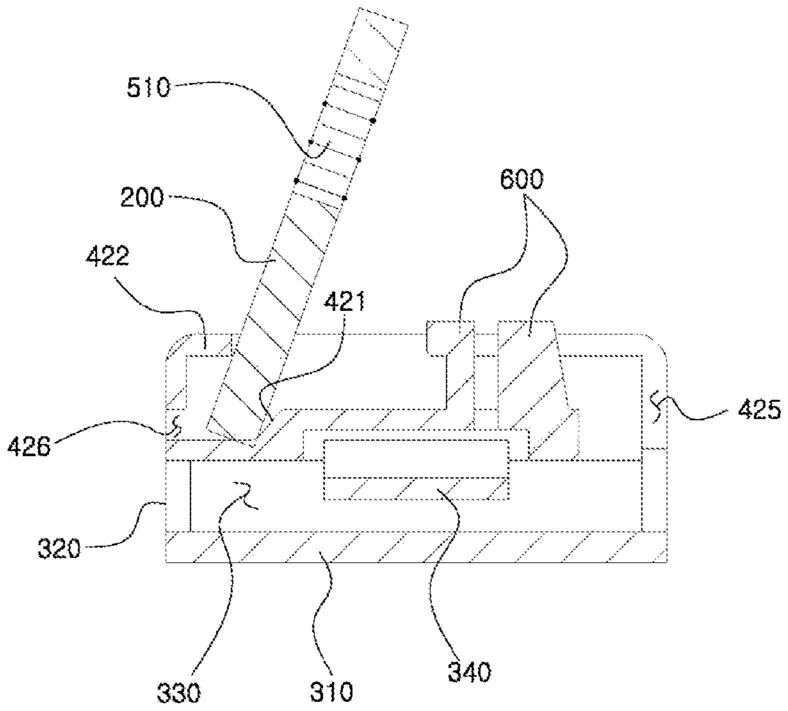
FIG. 7 is a side view of the wrist wearable knife of FIG. 6.
Figure 8:
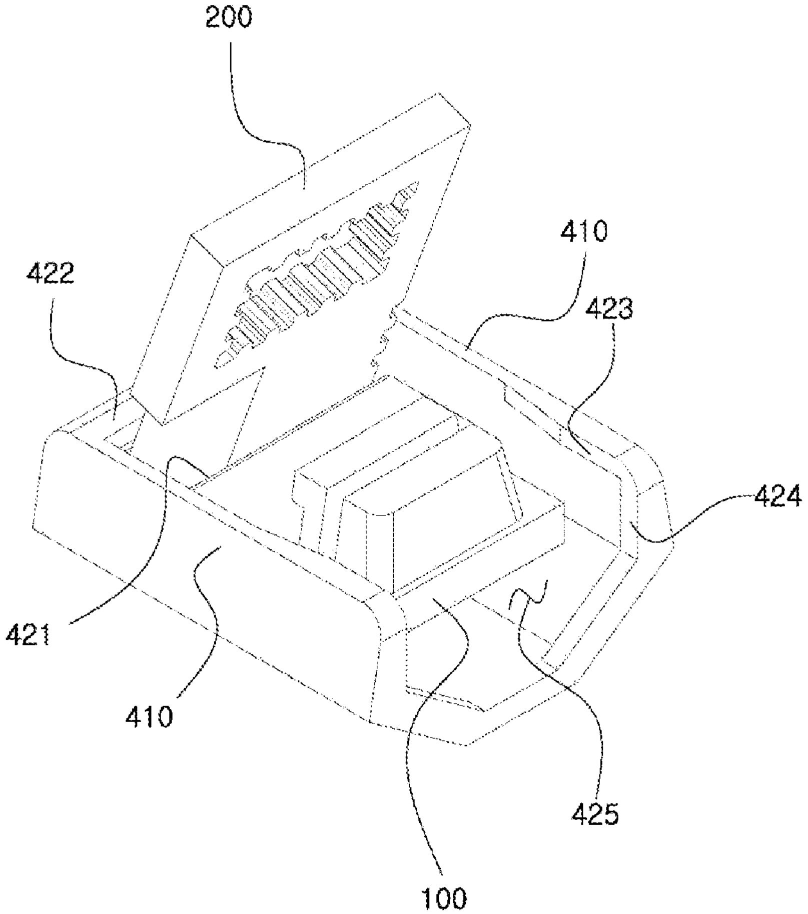
FIG. 8 is a rear perspective view of the wrist wearable knife of FIG. 6 viewed from the rear.
Figure 9:
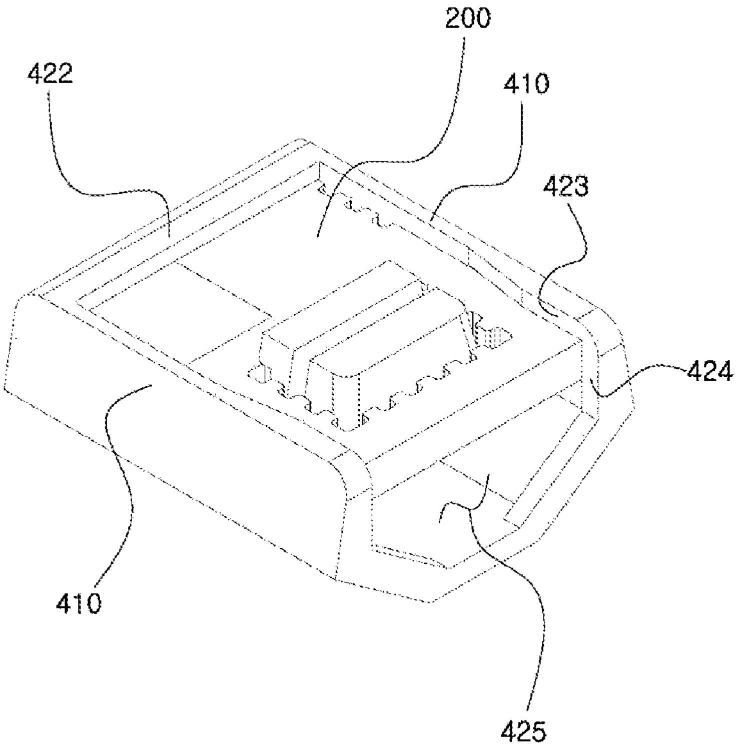
FIG. 9 is a rear perspective view of the wrist wearable knife of FIG. 1 viewed from the rear.
Figure 10:
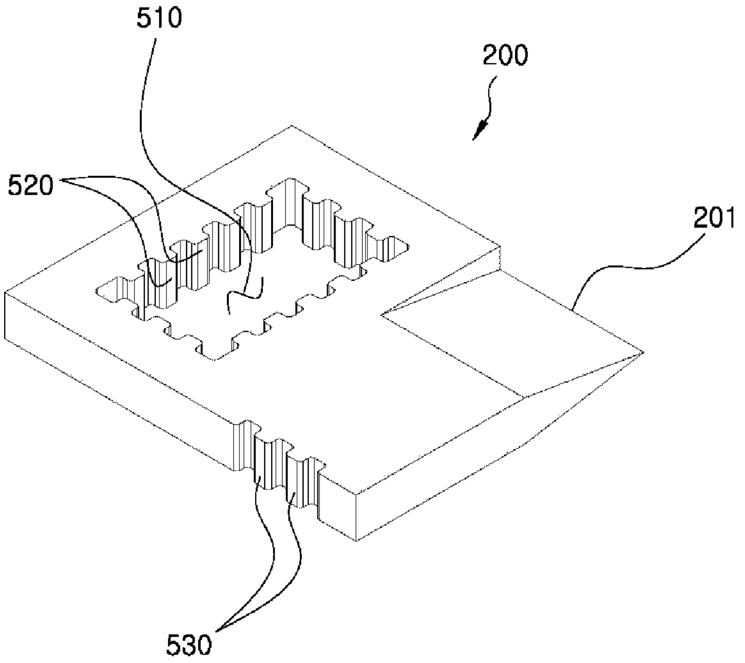
FIG. 10 is a perspective view illustrating separation of only the blade body in the wrist wearable knife of FIG. 1.

FIG. 5 is an exploded perspective view illustrating explosion of the wrist wearable knife of FIG. 1, FIG. 6 is an assembly perspective view illustrating a process of fitting a blade body into a sheath body of the wrist wearable knife of FIG. 5, and FIG. 7 is a side view of the wrist wearable knife of FIG. 6. FIG. 8 is a rear perspective view of the wrist wearable knife of FIG. 6 viewed from the rear and FIG. 9 is a rear perspective view of the wrist wearable knife of FIG. 1 viewed from the rear. FIG. 10 is a perspective view illustrating separation of only the blade body in the wrist wearable knife of FIG. 1.

A wrist wearable knife (WK) according to an embodiment of the present invention as a wrist wearable knife for wearing on a wrist of a user through a wrist strap (not illustrated) includes a sheath body 100 and a blade body 200 as illustrated in FIGS. 1 to 10. Hereinafter, each component will be described in detail with continued reference to FIGS. 1 to 10.

The sheath body 100 is a component for accommodating the blade body 200 as illustrated in FIGS. 1, 3 and 4. The sheath body 100 may be attached to or detached from a wrist strap (not illustrated) such as a watch strap or a bracelet so that the sheath body 100 is always worn on the wrist of the user when the wrist strap is worn.

The blade body 200 is a component that is directly used for cutting, slicing, and shaving objects. As illustrated in FIGS. 1, 3 and 4, the blade body 200 may be detachably provided on the sheath body 100.

Thus, since these components are provided, the sheath body 100 may be worn on the wrist of the user through a wrist strap (not illustrated), and the blade body 200 may be removed from the sheath body 100, and a blade 201 of the blade body 200 may be used, and after use, the blade body 200 may be mounted on the sheath body 100 again, and ultimately may be kept worn on the wrist at all times, so the wrist wearable knife may be used as a survival item when the user is in distress or in an emergency situation, not only in the mountains or the sea as well as everyday life.

In addition, the wrist wearable knife (WK) according to an embodiment of the present invention may further include a wrist strap detachable portion 300 as illustrated in FIGS. 2 to 4. The wrist strap detachable portion 300 may detach (mounted or remove) the sheath body 100 with respect to the wrist strap.

Specifically, as illustrated in FIGS. 2 to 4, the wrist strap detachable portion 300 may include a wrist contact portion 310, a spacer connection portion 320, and a wrist strap through-hole 330. The wrist contact portion 310 may be provided to be spaced apart from the surface of the sheath body 100 facing the wrist of the user (a lower surface of the sheath body 100 based on FIG. 2). The spacer connection portion 320 may connect the wrist contact portion 310 to one side of the sheath body 100 in a spaced state. The wrist strap through-hole 330 forms a separation space between the sheath body 100 and the wrist contact portion 310 and may detachably pass the wrist strap (not illustrated). Therefore, the wrist wearable knife (WK) of the present invention may be easily and quickly detached (mounted on or removed from) with respect to the wrist strap by pulling the wrist strap through the wrist strap through-hole 330.

Moreover, the wrist strap detachable unit 300 may further include a wrist strap pressing portion 340 as illustrated in FIGS. 2 to 4. The wrist strap pressing portion 340 may apply a fixing force to the wrist strap in a state where the wrist strap (not illustrated) passes through the wrist strap through-hole 330.

Specifically, as illustrated in FIG. 3, the wrist strap pressing portion 340 may protrude convexly from the sheath body 100 toward the wrist contact portion 310, and elastically press and fix the wrist strap (not illustrated) that passes through the wrist strap through-hole 330. Furthermore, as shown in FIG. 3, the wrist strap pressing portion 340 may have one end provided in a cantilever shape on the sheath body 100 and its center may be bent convexly toward the wrist contact portion 310. Therefore, as the wrist strap pressing portion 340 is provided in the cantilevered shape, the wrist strap pressing portion 340 may be elastically supported by the sheath body 100, and the wrist strap pressing portion 340 is pressed and has restoration force while the blade body 200 is mounted on the wrist strap (not illustrated), and the blade body 200 may be firmly fixed to the wrist strap by the restoration force of the wrist strap pressing portion 340.

In addition, the wrist worn knife (WK) according to the embodiment of the present invention may further include a blade body detachable portion as illustrated in FIGS. 1, and 3 to 9. The blade body attachable portion may allow the blade body 200 to be detachably provided in the sheath body 100.

Specifically, the blade body attachable portion may include left and right blade body accommodating portions 410 and blade body fitting portions 420 as illustrated in FIGS. 1 and 3 to 5. The left and right blade body accommodating portions 410 may be provided at both edges of the sheath body 100, respectively, and may surround and accommodate both circumferential surfaces of the blade body 200. The blade body fitting portion 420 may detachably fit the blade body 200 into the left and right blade body accommodating portions 410. Therefore, the sheath body 100 may be smoothly accommodated in the blade body 200 through the left and right blade body accommodating portions 410, and the sheath body 200 may be detached with respect to the blade body 200 by fitting the blade body 200 into the left and right blade body accommodating portions 410 through the blade body fitting portions 420, and in particular, since the fitting method is taken, it is possible to further increase stability by preventing the blade body 200 from sliding from the sheath body 100.

For example, as illustrated in FIGS. 1 and 3 to 7, the blade body fitting portion 420 may include a blade body guide inclined surface 421, a blade body support portion 422, and a blade body catching portion 423. As illustrated in FIG. 7, the blade guide inclined surface 421 may be formed on the front of the upper surface of the sheath body 100, and while the blade body 200 is inserted between the left and right blade body accommodating portions 410, may obliquely guide the blade body 200 to the front of the sheath body 100. As illustrated in FIGS. 6 and 7, the blade body support portion 422 may be connected across the front end of each of the left and right blade body accommodating portions 410, and when the rear part of the blade body 200 guided to the blade body guide inclined surface 421 is pressed from the top to the bottom, the front part of the blade body 200 is supported at the top to prevent the front part of the blade body 200 from rising upward. As illustrated in FIGS. 1, 3, and 8, the blade body upper catching portion 423 may be provided at the rear end of each of the left and right blade body accommodating portions 410, and when the rear part of the blade body 200 is pressed from the top to the bottom, inserted and caught with the blade body 200.

Therefore, while the blade body 200 is inserted between the left and right blade body accommodating portions 410, the blade body 200 may be guided obliquely to the front part of the sheath body 100 through the blade guide inclined surface 421, and when the blade body is guided to the blade body guide inclined surface 421, and then the rear part of the blade body 200 is pressed from the top to the bottom, the pressing force may be fully applied to the rear part of the blade body 200 while the blade body support portion 422 supports the front part of the blade body 200, and the blade body 200 may be inserted and caught in the blade body upper catching portion 423 while the rear part of the blade body 200 is pressed from the top the bottom by the pressing force.

Furthermore, each of the left and right blade body accommodating portions 410 may be elastically supported by the sheath body 100. Therefore, while the blade body 200 is inserted into the blade body upper catching portion 423, the left and right blade body accommodating portions 410 may be smoothly widened to the left and right.

In addition, the blade body fitting portion 420 may further include a blade body rear catching portion 424 as illustrated in FIGS. 5, 8, and 9. The blade body rear catching portion 424 may be provided at the rear end of each of the left and right blade body accommodating portions 410 and may prevent the blade body 200 from falling backward while being caught by the blade body upper catching portion 423. Therefore, it is possible to prevent the blade body 200 from falling backward while the blade body 200 is caught in the blade body upper catching portion 423, so that the blade 201 of the blade body 200 may be handled more safely.

Furthermore, the blade body fitting portion 420 may further include a finger insertion portion 425 as illustrated in FIGS. 8 and 9. The finger insertion portion 425 may be formed between the rear ends of the left and right blade body accommodating portions 410 and may have an open shape for inserting a finger to lift the rear end of the blade body 200.

In addition, the blade body fitting portion 420 may further include a drain hole 426 as illustrated in FIGS. 1 and 4 to 7. The drain hole 426 may be formed between the blade body support portion 422 and the sheath body 100, and may discharge water flowing into the end of the blade body guide inclined surface 421.

In addition, the blade body fitting portion 420 may further include a plurality of removal anti-slip protrusions 427 as illustrated in FIG. 5. The removal anti-slip protrusion 427 may be provided at the front part of the blade body 200, and when the blade body 200 is removed, may prevent the finger from sliding while the front part of the blade body 200 is pressed with the other one finger by lifting the rear part of the blade body 200 with any one finger through the finger insertion portion 425. For reference, the removal anti-slip protrusion 427 is illustrated only in FIG. 5 to be illustrated in the drawing.

In addition, the wrist wearable knife (WK) according to the embodiment of the present invention may further include a grip portion 500 as illustrated in FIGS. 5, 6, and 10. The grip portion 500 may be provided in the blade body 200 and increase the grip sense of the blade body 200 while using the blade body 200.

Specifically, the grip portion 500 may include a gripping hole 510 and a plurality of main grip protrusions 520 as illustrated in FIGS. 5, 6, and 10. The gripping hole 510 may be opened at the center of the blade body 200 and may hold a position where a thumb (not illustrated) and a middle finger (not illustrated) of a wearer face each other. Each of the main grip protrusions 520 may be formed along the inner circumferential surface of the gripping hole 510 and may prevent the thumb and the middle finger facing each other from slipping. For example, the gripping hole 510 may be opened in a substantially rectangular shape. Therefore, it is possible to hold the position where the thumb and the middle finger face each other with respect to the blade body 200 through the gripping hole 510, and the slipping of the thumb and the middle finger facing each other may be prevented through the plurality of main grip protrusions 520, thereby increasing the grip sense.

Furthermore, the grip portion 500 may further include a plurality of auxiliary grip protrusions 530 as illustrated in FIGS. 5 and 10. Each of these auxiliary grip protrusions 530 may be provided at the front part of one side circumferential surface of the blade body 200 and may prevent slipping when the wearer's index finger (not illustrated) touches them. Therefore, even if the index finger presses the front part of one side circumferential surface of the blade body 200 through the plurality of auxiliary grip projections 530, it is possible to prevent the index finger from slipping, thereby increasing the grip sense along with the plurality of main grip projections 520. For reference, referring to FIGS. 5 and 10, the blade 201 may be provided at the front of the circumferential surface of the other side of the blade body 200.

In addition, the wrist wearable knife (WK) according to the embodiment of the present invention may further include a finger support portion 600 as illustrated in FIGS. 4 and 7. The finger support portion 600 may protrude on the upper surface of the sheath body 100 to correspond to the gripping hole 510. Therefore, while lifting the blade body 200 with one finger so that the blade body 200 is smoothly separated from the sheath body 100 when the blade body 200 is removed, the pressing force may be applied to the sheath body 100 through the finger support portion 600 with the other one finger.

On the other hand, the wrist strap detachable portion 300 and the blade body detachable portion 400 (excluding the removal anti-slip protrusion 427) and the finger support portion 600 may form one body with the sheath body 100, and the grip portion 500 may form one body with the blade body 200.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a knife, and has an industrial applicability.

The invention claimed is:

1. A wrist wearable knife comprising:

a sheath body adapted to be attached to and detached from a wrist strap, the sheath body including a wrist strap detachable portion having, a wrist contact portion spaced apart from a surface of the sheath body that faces a user's wrist;

a spacer portion connecting the wrist contact portion to one side of the sheath body to maintain the spaced-apart arrangement, thereby defining a wrist strap through-hole between the sheath body and the wrist contact portion; and a wrist strap pressing portion protruding from the sheath body toward the wrist contact portion and configured to elastically press a wrist strap passing through the wrist strap through-hole;

a blade body detachably provided in the sheath body; and a blade body detach portion configured to detachably secure the blade body in the sheath body, the blade body detachable portion including:

left and right blade body accommodating portions respectively provided at opposite side edges of the sheath body and arranged to surround opposite side surfaces of the blade body; and a blade body fitting portion that detachably holds the blade body between the left and right blade body accommodating portions.

2. The wrist wearable knife of claim 1, wherein the wrist strap pressing portion is formed as a cantilevered extension of the sheath body and is convexly curved toward the wrist contact portion so as to elastically bias against the wrist strap.

* * * * *